(12) United States Patent
Leone et al.

(10) Patent No.: US 9,664,147 B2
(45) Date of Patent: May 30, 2017

(54) FUEL SEPARATION SYSTEM FOR REDUCING PARASITIC LOSSES

(71) Applicant: Ford Global Technologies, LLC, Dearborn, MI (US)

(72) Inventors: Thomas G. Leone, Ypsilanti, MI (US); James Eric Anderson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 14/062,406

(22) Filed: Oct. 24, 2013

(65) Prior Publication Data

US 2015/0114359 A1    Apr. 30, 2015

(51) Int. Cl.
*B01D 61/36* (2006.01)
*F02M 25/08* (2006.01)
(Continued)

(52) U.S. Cl.
CPC ..... *F02M 25/0872* (2013.01); *F02D 19/0649* (2013.01); *F02D 19/0668* (2013.01); *F02D 41/0025* (2013.01); *F02D 41/0032* (2013.01); *F02M 25/089* (2013.01); *F02M 37/0088* (2013.01); *F02D 19/0655* (2013.01); *F02D 19/0692* (2013.01); *F02D 19/081* (2013.01); *Y02T 10/36* (2013.01)

(58) Field of Classification Search
CPC ............ F02D 19/0649; F02D 19/0671; F02D 19/0668; F02D 41/0025; F02D 41/0032; Y02T 10/36; F02M 25/0872; F02M 25/089; F02M 25/0836; F02M 25/0854; F02M 37/0088

USPC ........................ 123/519, 516, 518, 520, 698; 137/587–589
See application file for complete search history.

(56) References Cited

U.S. PATENT DOCUMENTS 3,254,620 A   6/1966   Cannon
4,391,716 A   7/1983   McCurry
(Continued)

FOREIGN PATENT DOCUMENTS

JP    407019124 A    1/1995
JP    2006257907 A   9/2006
(Continued)

OTHER PUBLICATIONS

Leone, Thomas G., "Octane Separation System and Operating Method," U.S. Appl. No. 13/973,886, filed Aug. 22, 2013, 80 pages.
(Continued)

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Systems and methods for separating higher octane fuel from a fuel mixture are presented. In one example, higher octane fuel is separated from lower octane fuel and allowed to condense in a fuel tank holding higher octane fuel so that parasitic engine losses are not increased by having to separate higher octane fuel from lower octane fuel a second time. The approach may be applied to fuel systems that include multiple fuel tanks storing different types of fuel.

19 Claims, 4 Drawing Sheets

(51) Int. Cl.
    *F02M 37/00*     (2006.01)
    *F02D 19/06*     (2006.01)
    *F02D 41/00*     (2006.01)
    *F02D 19/08*     (2006.01)

(56) References Cited

U.S. PATENT DOCUMENTS

| | | |
|---|---|---|
| 5,237,978 A | 8/1993 | Bailey |
| 6,450,193 B1 | 9/2002 | Constantinou |
| 6,972,093 B2 * | 12/2005 | Partridge ............... C10G 31/11 123/1 A |
| 7,293,552 B2 | 11/2007 | Leone et al. |
| 7,331,334 B2 | 2/2008 | Leone et al. |
| 7,389,751 B2 | 6/2008 | Leone et al. |
| 7,395,786 B2 | 7/2008 | Leone et al. |
| 7,426,925 B2 | 9/2008 | Leone et al. |
| 7,469,684 B2 | 12/2008 | Leone et al. |
| 7,647,916 B2 | 1/2010 | Leone et al. |
| 7,721,710 B2 | 5/2010 | Leone et al. |
| 7,845,315 B2 | 12/2010 | Leone et al. |
| 7,877,189 B2 | 1/2011 | Leone |
| 8,065,979 B2 | 11/2011 | Leone et al. |
| 8,127,745 B2 | 3/2012 | Surnilla et al. |
| 8,141,356 B2 | 3/2012 | Leone et al. |
| 8,375,899 B2 | 2/2013 | Leone et al. |
| 8,387,591 B2 | 3/2013 | Surnilla et al. |
| 8,550,058 B2 | 10/2013 | Pursifull et al. |
| 2005/0103285 A1 * | 5/2005 | Oda ....................... F02B 51/00 123/3 |
| 2007/0295307 A1 | 12/2007 | Kerns |
| 2008/0000633 A1 | 1/2008 | Xu et al. |
| 2008/0006333 A1 * | 1/2008 | Partridge ............... B60K 15/03 137/571 |
| 2009/0157277 A1 * | 6/2009 | Pursifull ................ F02B 43/10 701/102 |
| 2013/0333644 A1 * | 12/2013 | Shigetoyo ........... F02D 19/0649 123/41.08 |
| 2014/0007842 A1 * | 1/2014 | Kudo .................. F02D 19/0671 123/445 |
| 2014/0041642 A1 * | 2/2014 | Tsutsumi ............... F02M 31/00 123/541 |
| 2015/0114370 A1 * | 4/2015 | Leone ................. F02D 41/0025 123/575 |

FOREIGN PATENT DOCUMENTS

| | | |
|---|---|---|
| SU | 0731020 A | 4/1980 |
| SU | 0848725 A | 7/1981 |

OTHER PUBLICATIONS

Leone, Thomas G., "Octane Separation System and Operation Method," U.S. Appl. No. 13/973,879, filed Aug. 22, 2013, 80 pages.

Leone, Thomas G., "Octane Separation System and Operating Method," U.S. Appl. No. 13/973,872, filed Aug. 22, 2013, 80 pages.

Leone, Thomas G. et al., "Vapor Purging Octane Separation System," U.S. Appl. No. 14/019,362, filed Sep. 5, 2013, 40 pages.

Leone, Thomas G. et al., "Fuel Separation Via Fuel Vapor Management System," U.S. Appl. No. 14/062,398, filed Oct. 24, 2013, 48 pages.

* cited by examiner

FUEL SEPARATION SYSTEM FOR REDUCING PARASITIC LOSSES

FIELD

The present description relates to a system and methods for reducing parasitic losses that may be associated with separating a fuel mixture into its component fuels. The methods may be particularly useful for engines that operate on more than one fuel type.

BACKGROUND AND SUMMARY

An engine may be supplied different types of fuel during different engine operating conditions to enhance engine performance and/or fuel economy. For example, an engine may be supplied gasoline via a first fuel injector and ethanol via a second fuel injector. Gasoline may be the sole fuel supplied to the engine at lower engine loads where the possibility of engine knock may be reduced. As engine load increases, ethanol begins to be supplied to the engine in increasing amounts. Ethanol is also supplied as a greater fraction of fuel provided to the engine so that the possibility of engine knock may be reduced. However, vehicle owners may not be willing to fill a vehicle with two types of fuel to obtain the benefits of operating an engine with two distinct and separate fuels.

One way of supplying two different types of fuel to an engine via refilling a single fuel tank is to separate fuels from a mixture of fuels via a selectively permeable membrane. A fuel mixture comprising two or more fuel types may be exposed to one side of a fuel separating membrane. A pump increases the pressure of the fuel mixture to increase the quantity of higher octane fuel that may be separated or extracted from the fuel mixture. After the fuels are separated the fuels may be stored in separate fuel tanks. However, operating the pump to separate the two fuels increases parasitic losses in the vehicle and the higher and lower octane fuels may recombine via the fuel vapor management system.

Two separated fuels stored in separate tanks may recombine via diurnal heating and cooling of the fuel system. United States of America Patent Publication 2008/000633 describes a way to handle fuel tank vapors from multiple fuel tanks. However, in the system described by publication 2008/000633 fuel vapors of higher octane fuels may condense in fuel tanks holding lower octane fuel. Therefore, additional parasitic energy may be needed to once again separate the higher octane fuel from the lower octane fuel so that engine performance and fuel efficiency may be achieved via the two different fuel types.

The inventors herein have recognized the above-mentioned disadvantages and have developed a method for operating an engine, comprising: separating higher octane fuel vapors from a first lower octane fuel; storing the separated fuel vapors in a first fuel vapor storage canister; and limiting the separated fuel vapors from re-entering the first fuel tank holding the first lower octane fuel while not limiting the separated fuel vapors from entering a second fuel tank holding a higher octane fuel.

By separating higher octane fuel from a lower octane fuel mixture and preventing the higher octane fuel from recombining with the lower octane fuel mixture, it may be possible to reduce parasitic losses associated with separating higher octane fuel from a lower octane fuel mixture. Additionally, it may be possible to separate higher octane fuel from a lower octane fuel mixture via diurnal heating without having to recombine the high octane fuel with the lower octane fuel mixture during diurnal cooling so that the higher octane fuel may be separated from the lower octane fuel mixture indefinitely. Consequently, it may be possible to use diurnal heating and cooling to reduce parasitic losses that may accompany separating two types of fuel.

The present description may provide several advantages. For example, the approach may reduce parasitic engine losses that decrease engine fuel economy. Additionally, the approach may provide for more efficient use of fuel vapors. Further still, the approach may be applied to a wide range of fuel system configurations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
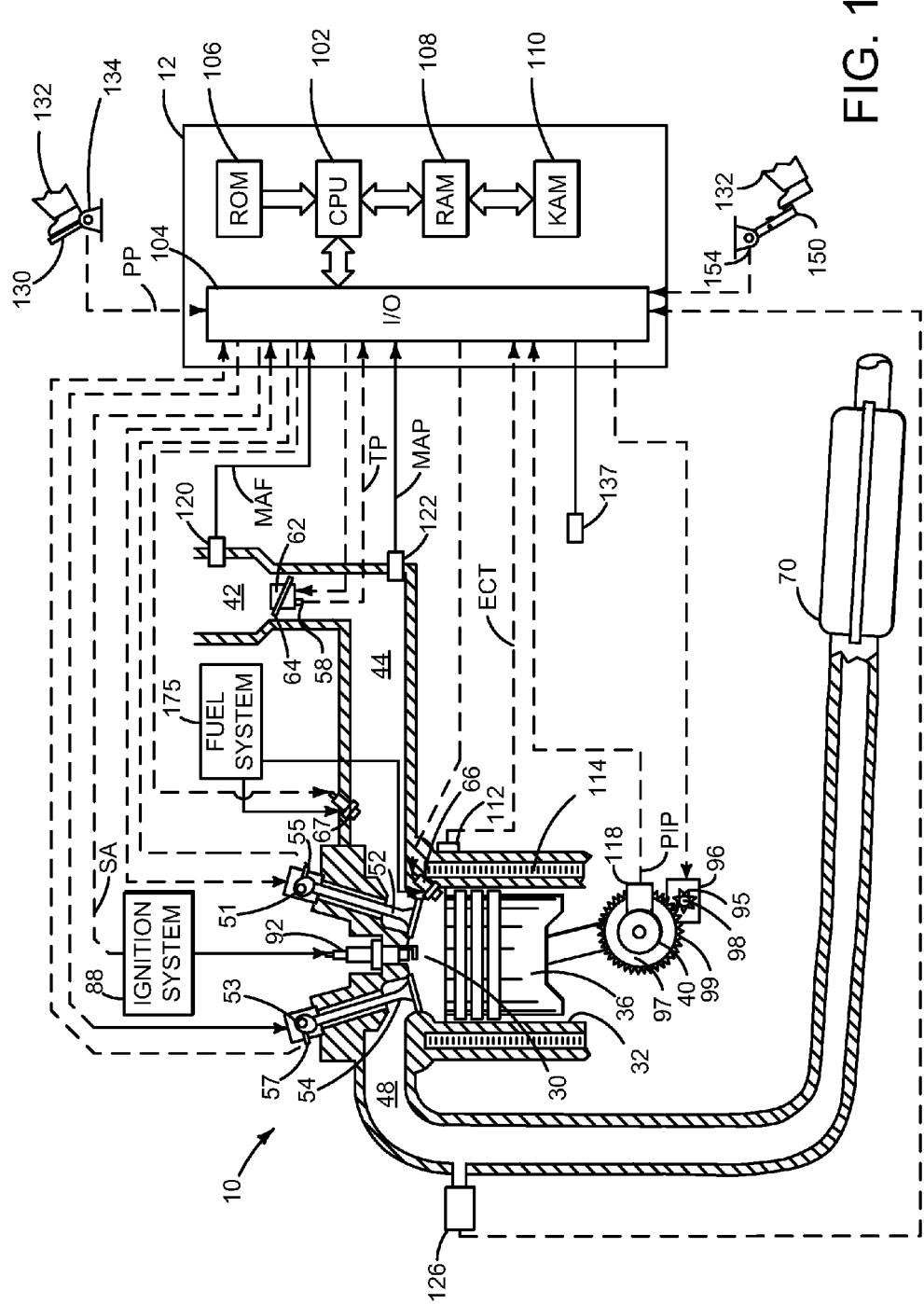
FIG. 1 is a schematic diagram of an engine.

The present description is related to controlling fuel vapors of a vehicle. The fuel vapors may be used in an engine as shown in FIG. 1. The engine may be supplied fuel from one or more fuel tanks as shown in the fuel systems of FIGS. 2 and 3. Component fuels may be separated from a fuel mixture comprising two or more fuels via diurnal heating and cooling of vehicle fuel systems. The vehicle fuel systems may be arranged to allow higher octane fuel vapors to condense only in a higher octane fuel tank so that the possibility of unintended fuel mixing may be reduced. The method of FIG. 4 operates the vehicle fuel system in a way that reduces the possibility of mixing fuels via the evaporative emissions section of the vehicle fuel system.

Referring to FIG. 1, internal combustion engine 10, comprising a plurality of cylinders, one cylinder of which is shown in FIG. 1, is controlled by electronic engine controller 12. Electrical connections between controller 12 and the various sensors and actuators are indicated by dashed lines.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIGS. 2 and 3. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; a measurement of ambient temperature via temperature sensor 137; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
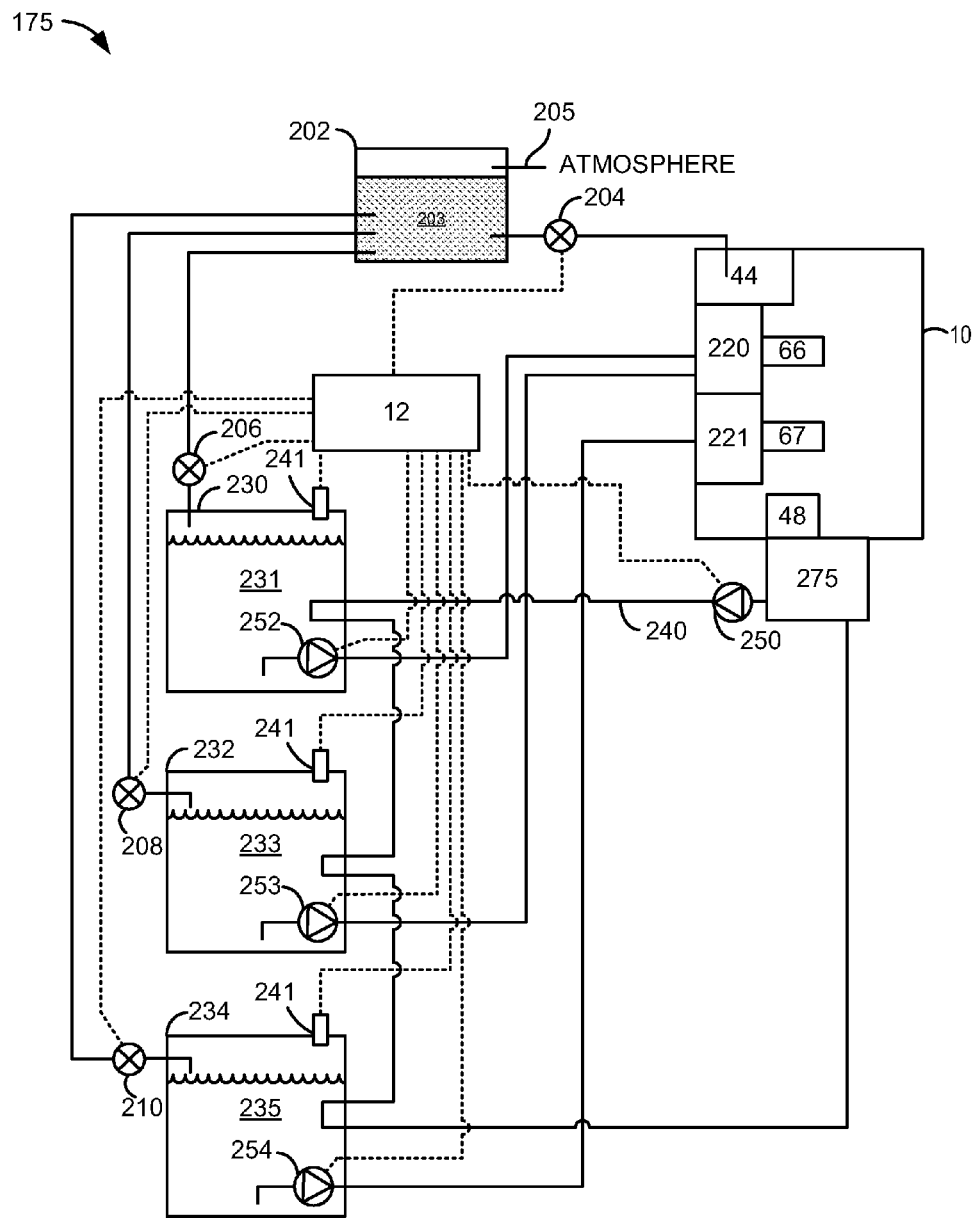
FIGS. 2 and 3 show example vehicle fuel systems.

Referring now to FIG. 2, an example fuel system 175 is shown in detail. The fuel system of FIG. 2 may supply fuel to engine 10 shown in detail in FIG. 1. The system of FIG. 2 may be operated according to the method of FIG. 4. Fuel system components and fluidic conduits are shown as solid lines and electrical connections are shown as dashed lines.

Fuel system 175 includes a fuel vapor storage canister 202 for storing fuel vapors. Fuel system 175 includes carbon 203 for storing and releasing fuel vapors. Fuel vapors stored in fuel vapor storage canister 202 may have a higher octane number than liquid fuel stored in one or more fuel tanks that supply fuel vapors to fuel vapor storage canister 202. Fuel vapor storage canister 202 is shown including atmospheric vent 205 which allows air to flow into and out of fuel vapor storage canister 202. Fuel vapors may be supplied to fuel vapor storage canister 202 via fuel tanks 230, 232, and 234. Although three fuel tanks are shown, alternative examples may include fewer or additional fuel tanks without departing from the scope or intent of this description. Fuel vapors may be purged via purge valve 204 which allows fluidic communication between fuel vapor storage canister 202 and engine intake manifold 44.

Engine 10 includes a first fuel rail 220 that supplies fuel to direct fuel injector(s) 66. Engine 10 also includes a second fuel rail 221 that supplies fuel to port fuel injector(s) 67. Fuel vapors may be inducted into intake manifold 44 when intake manifold pressure is below atmospheric pressure. In some examples, engine coolant or exhaust gases from exhaust manifold 48 may transfer heat energy to a fluid via heat exchanger 275. The fluid may be directed to fuel tanks 230, 232, and 234 via conduit 240 and pump 250. The heated fluid may increase the temperature of fuels 231, 233, and 235 to increase a rate of vapor separation from the respective fuels.

In one example, fuel tank 230 is a fuel tank that holds a higher octane fuel. Fuel tank 232 holds a medium octane fuel that has an octane number between the fuel stored in fuel tank 230 and the fuel stored in fuel tank 234. Fuel tank 234 holds a lower octane fuel that has an octane number that is less than the fuels stored on fuel tanks 230 and 232. Fuel tank 230 supplies fuel 231 to fuel rail 220 and direct injector(s) 66 via fuel pump 252. Fuel tank 232 supplies fuel 233 to fuel rail 220 and direct injector(s) 66 via fuel pump 253. Fuel tank 234 supplies fuel 235 to fuel rail 221 and port injector(s) 67 via fuel pump 254.

Fuel vapors from fuel tank 230 may be directed to fuel vapor storage canister 202 from fuel tank 230 via fuel vapor valve 206. Fuel vapors from fuel tank 232 may be directed to fuel vapor storage canister 202 from fuel tank 232 via fuel vapor valve 208. Fuel vapors from fuel tank 234 may be directed to fuel vapor storage canister 202 from fuel tank 234 via fuel vapor valve 210.

Controller 12 may receive inputs from the sensors described in FIG. 1 as well as sensors 241. In one example, sensors 241 may be temperature sensors. Alternatively, sensors 241 may be pressure sensors. Controller 12 also activates and deactivates fuel vapor valves 206, 208, and 210 in response to fuel system and engine operating conditions. Controller 12 also activates and deactivates fuel vapor purge valve 204 in response to fuel system and engine operating conditions. Additionally, controller 12 selectively operates pump 250 to increase the production of fuel tank vapors.

Figure 4:
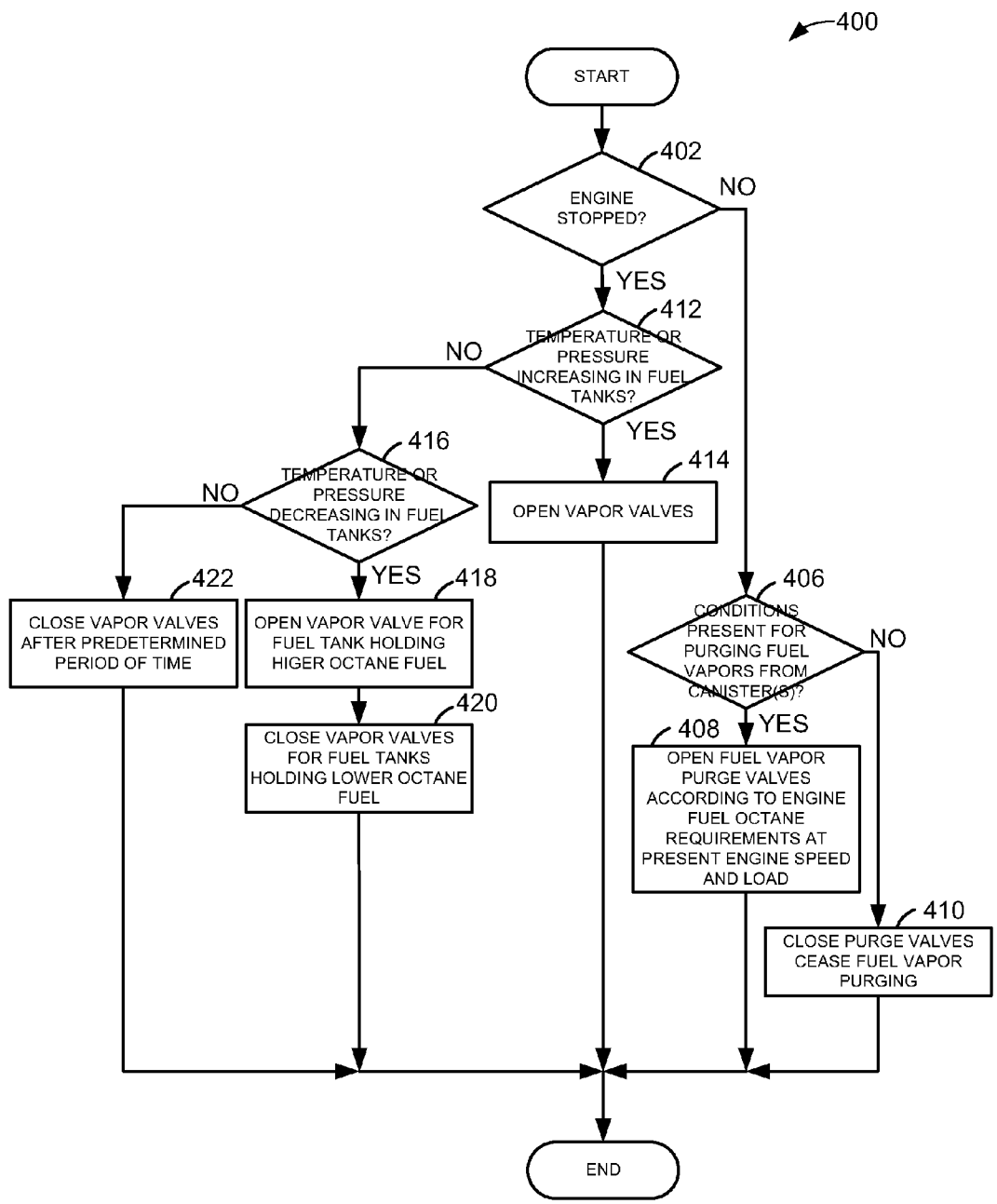
FIG. 4 shows an example method for operating a fuel system of a vehicle.

In one example, the system of FIG. 2 operates according to the method of FIG. 4 via executable instructions stored in non-transitory memory of controller 12. While engine 10 is operating, fuel vapors from fuel tanks 230, 232, and 234 may be stored in fuel vapor storage canister 202 via opening fuel vapor valves 206, 208, and 210. Fuel vapor valves 206, 208, and 210 may be opened in response to temperatures within fuel tanks 230, 232, and 234 exceeding individual threshold temperatures that are based on the fuel type stored in the respective fuel tanks. Alternatively, fuel vapor valves 206, 232, and 234 may be opened in response to pressures within fuel tanks 230, 232, and 234 exceeding individual threshold pressures that are based on the fuel type store in the respective fuel tanks.

Fuel vapors from fuel tanks 230, 232, and 234 push air out of atmospheric vent 205 and are stored by carbon 203 when temperature and/or pressure in fuel tanks 230, 232, and 234 is increasing. If engine 10 is operating while vapors are being directed to fuel vapor storage canister 202, fuel vapor purge valve 204 may be opened so that fuel vapors are drawn into and combusted in engine 10. If engine 10 is not operating or if fuel vapor purge valve 204 is closed, fuel vapor valves 206, 208, and 210 may be opened if temperature and/or pressure in fuel tanks 230, 232, and 234 are increasing so that fuel vapors may be stored in fuel vapor storage canister 202.

On the other hand, if engine 10 is not operating or if fuel vapor purge valve 204 is closed while temperature and/or pressure in fuel tanks 230, 232, and 234 are decreasing, fuel vapor valves 208 and 210 may be closed so that fuel vapors stored in fuel vapor storage canister 202 may be released to fuel tank 230. In this way, higher octane fuel vapors that have separated from fuel 233 and fuel 235 may condense and be stored in fuel tank 230. Fuel vapors from fuels 233 and 235 may have higher octane numbers than fuels 233 and 235. Thus, higher octane fuel vapors that may be produced via diurnal temperature changes in the fuel system may be recovered and stored to a fuel tank that holds higher octane fuel so that higher octane fuel components remain separated from lower octane fuels during fuel system heating and cooling. Higher octane fuel vapor that condenses in fuel tank 230, which stores higher octane fuel, may also be injected to engine 10 via fuel injector(s) 66.

Further, fuel vapors may enter fuel vapor storage canister 202 only from fuel tanks 230, 232, and 234. Fuel vapors may exit fuel vapor storage canister 202 and flow only to the engine via purge valve 204 and engine vacuum or to fuel tank 230 via diurnal cooling of fuel in fuel tank 230 when vapor valve 206 is open. Fuel vapors from fuel vapor canister 202 are prevented from entering fuel tanks 232 and 234 during diurnal cooling via closing vapor valves 208 and 210. Closing vapor valves 208 and 210 also prevents fuel vapors from fuel tank 232 from entering fuel tank 234 and vice-versa during diurnal cooling of fuel in the fuel system.

Figure 3:
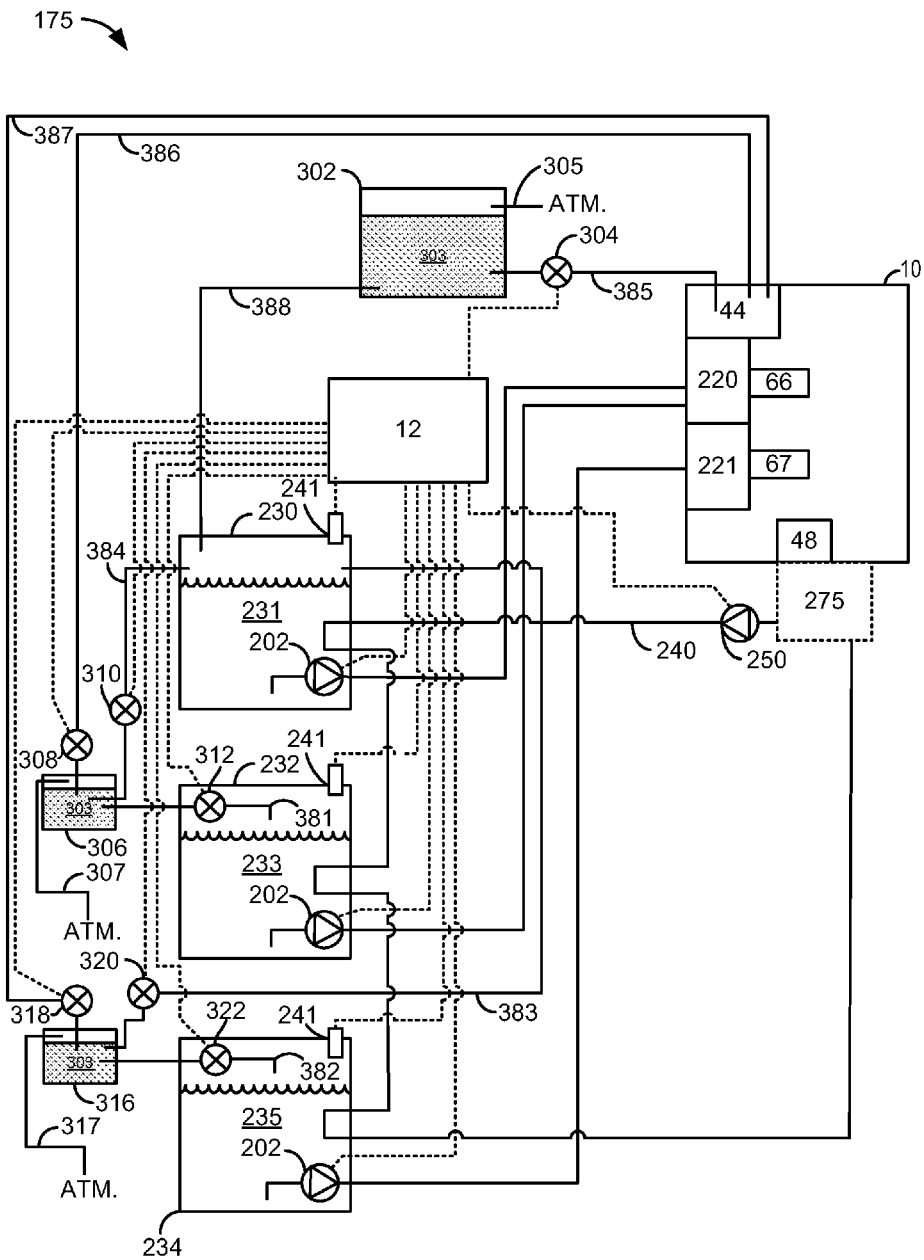

Referring now to FIG. 3, an alternative example fuel system 175 is shown in detail. The fuel system of FIG. 3 may supply fuel to engine 10 shown in detail in FIG. 1. The system of FIG. 3 may be operated according to the method of FIG. 4. Fuel system components and fluidic conduits that allow fluidic communication are shown as solid lines while electrical connections are shown as dashed lines. Fuel system devices and components shown in FIG. 3 that have the same numerical identifiers as devices and components shown in FIG. 2, are equivalent and operate as described in FIG. 2. For example, fuel tank 230 stores a higher octane fuel than fuel tanks 232 and 234. Therefore, the descriptions of fuel system components that are described in FIG. 2 are omitted for the sake of brevity.

In this example, fuel system 175 includes three fuel vapor storage canisters 302, 306, and 316; however the number of fuel vapor storage canisters may increase or decrease if the number of fuel tanks is increased or decreased as is mentioned in the system of FIG. 2. Each fuel vapor storage canister includes carbon 303 for storing fuel vapors. First fuel vapor storage canister 302 includes an atmospheric vent 305. Additionally, fuel vapor storage canisters 306 and 316 include respective atmospheric vents 307 and 317. Second fuel vapor storage canister 306 may be in fluidic communication with fuel tank 230 via conduit 384 when fuel vapor valve 310 is open. Third fuel vapor storage canister 316 may also be in fluidic communication with fuel tank 230 via conduit 383 when fuel vapor valve 320 is open. Fuel vapors produced in fuel tank 232 may be routed to fuel vapor storage canister 306 via conduit 381 when fuel vapor valve 312 is in an open state so as to allow fluidic communication between fuel tank 232 and fuel vapor storage canister 306. Similarly, fuel vapors produced in fuel tank 234 may be routed to fuel vapor storage canister 316 via conduit 382 when fuel vapor valve 322 is in an open state so as to allow fluidic communication between fuel tank 234 and fuel vapor storage canister 316. First fuel vapor storage canister 302 is shown in direct fluidic communication with fuel tank 230 via conduit 388.

Fuel vapor storage canister 302 may be purged of fuel vapors via opening purge valve 304 to allow fluidic communication between fuel vapor storage canister 302 and engine intake manifold 44 via conduit 385. Similarly, fuel vapor storage canister 306 may be purged of fuel vapors via opening purge valve 308 to allow fluidic communication between fuel vapor storage canister 306 and engine intake manifold 44 via conduit 386. Likewise, fuel vapor storage canister 316 may be purged of fuel vapors via opening purge valve 318 to allow fluidic communication between fuel vapor storage canister 316 and engine intake manifold 44 via conduit 387.

In one example, the system of FIG. 3 operates according to the method of FIG. 4 via executable instructions stored in non-transitory memory of controller 12. While engine 10 is operating, fuel vapors from fuel tank 230 may be stored in fuel vapor storage canister 302. Fuel vapors from fuel tank 232 may be stored in fuel vapor storage canister 306, and fuel vapors from fuel tank 234 may be stored in fuel vapor storage canister 316. Fuel vapors may be stored in fuel vapor storage canisters 302, 306, and 316 when the engine is operating at conditions where fuel vapors are not being accepted by the engine (e.g., during deceleration fuel cut-out). When fuel vapors may be combusted by the engine, vapor purge valves 304, 308, and/or 318 may be opened to allow fuel vapors to flow to engine intake manifold 44 from the respective fuel vapor storage canisters 302, 306, and 316.

In one example, fuel vapors from one or more of fuel vapor storage canisters 302, 306, and 316 may be allowed to flow to engine 10 only during conditions where higher octane fuel is supplied to the engine in response to engine speed and load conditions or when engine knock is determined present. However, if it is determined that one or more of canisters 302, 306, and 316 has stored more than a predetermined threshold hydrocarbon storage capacity (e.g., 85% of the canister's hydrocarbon storage capacity), the purge valve corresponding to the fuel vapor storage canister at the threshold hydrocarbon storage capacity may be opened to allow the fuel vapor storage canister to be purged. For example, if fuel vapor storage canister 306 is determined to have stored an amount of hydrocarbons above the predetermined threshold hydrocarbon storage capacity, vapor purge valve 308 may be opened to reduce the amount of stored fuel vapor in fuel vapor storage canister 306. Further, vapor purge valve 308 may be opened when engine speed and load are in a range where a higher octane fuel is supplied to the engine to limit the possibility of engine knock.

If engine 10 is off (e.g., not rotating) or not accepting fuel vapors, and if temperature and/or pressure is increasing in fuel tank 232 fuel vapor valve 312 may be opened to allow fuel vapors to exit fuel tank 232 and enter fuel vapor storage canister 306, thereby reducing fuel system vapor pressure. Similarly, if engine 10 is off or not accepting fuel vapors, and if temperature and/or pressure is increasing in fuel tank 234 fuel vapor valve 322 may be opened to allow fuel vapors to exit fuel tank 234 and enter fuel vapor storage canister 316, thereby reducing fuel system vapor pressure. Increasing fuel temperature and/or pressure in fuel tank 230 causes fuel vapors from fuel tank 230 to enter fuel vapor storage canister 302 since no purge valve is positioned along conduit 388. Fuel vapor valves 310, 320, 312, and 322 may be operated independently or at the same time. Likewise, purge valves 304, 308, and 318 may be operated independently or at the same time.

On the other hand, if engine 10 is not operating or accepting fuel vapors while temperature and/or pressure in fuel tanks 230, 232, and 234 are decreasing, fuel vapor valves 312 and 322 may be closed. Further, fuel vapor valves 310 and 320 may be opened so that fuel vapors stored in fuel vapor storage canisters 306 and 316 may be released to fuel tank 230. Opening vapor valve 310 and closing vapor valve 312 allows air to be drawn into fuel vapor storage canister via atmospheric vent 307 when fuel system cooling reduces the amount of vapor in the fuel system. Likewise, opening vapor valve 320 and closing vapor valve 322 allows air to be drawn into fuel vapor storage canister via atmospheric vent 317 when fuel system cooling reduces the amount of vapor in the fuel system.

In this way, higher octane fuel vapors that have separated from fuel 233 and fuel 235 may condense and be stored in fuel tank 230. Fuel vapors from fuels 233 and 235 may have higher octane numbers than fuels 233 and 235. Thus, higher octane fuel vapors that may be produced via diurnal temperature changes in the fuel system may be recovered and stored to a fuel tank that holds higher octane fuel so that higher octane fuel components remain separated from lower octane fuels during fuel system heating and cooling. Higher octane fuel vapor that condenses in fuel tank 230, which stores higher octane fuel, may also be injected to engine 10 via fuel pump 202 and fuel injector(s) 66.

Further, fuel vapors may enter fuel vapor storage canister 302 only from fuel tanks 230, 232, and 234. Fuel vapors may exit fuel vapor storage canister 302 and flow only to the engine via purge valve 304 and engine vacuum or to fuel tank 230 via diurnal cooling of fuel in fuel tank 230. Fuel vapors from fuel vapor canister 302 are prevented from entering fuel tanks 232 and 234 during diurnal cooling via closing vapor valves 312 and 322. Closing vapor valves 312 and 322 also prevents fuel vapors from fuel tank 232 from entering fuel tank 234 and vice-versa during diurnal cooling of fuel in the fuel system. Likewise, closing vapor valve 312 during diurnal cooling prevents fuel vapors from passing from fuel vapor canister 306 into fuel tank 232. Closing vapor valve 322 during diurnal cooling prevents fuel vapors from passing from fuel vapor canister 316 to fuel tank 234.

In some examples, fuel vapor valve 310 may be replaced with a check valve that limits or prevents flow of fuel vapors from fuel tank 230 to fuel vapor storage canister 306 and that allows fuel vapors to flow from fuel vapor storage canister 306 to fuel tank 230. Similarly, fuel vapor valve 320 may be replaced with a check valve that limits or prevents flow of fuel vapors from fuel tank 230 to fuel vapor storage canister 316 and that allows fuel vapors to flow from fuel vapor storage canister 316 to fuel tank 230. Check valves or actively controlled valves (not shown) may also be used to allow atmospheric air into tanks 232 and 234 and thus prevent excessive vacuum in the tanks during diurnal cooling.

Referring now to FIG. 4, a method for operating a fuel system of a vehicle is shown. The method of FIG. 4 may be stored as executable instructions in non-transitory memory a controller of a system as shown in FIG. 1. The method of FIG. 4 may be applied to the example fuel systems shown in FIGS. 2 and 3 as well as other fuel systems.

At 402, method 400 judges whether or not the engine is stopped. In one example, the engine may be judged to be stopped rotating if engine speed is zero. If method 400 judges that the engine is stopped, the answer is yes and method 400 proceeds to 412. Otherwise, the answer is no and method 400 proceeds to 406.

At 406, method 400 judges whether or not conditions are present for purging fuel vapors from fuel vapor storage canisters. The fuel system may include two or more fuel tanks and one or more fuel vapor storage canisters as shown in FIGS. 2 and 3. In one example, method 400 may judge that conditions are present for purging fuel vapors from fuel canisters when the engine is combusting air-fuel mixtures (e.g., one or more cylinders are activated), and when the amount of fuel vapors stored in a fuel vapor storage canister exceeds a threshold level of fuel. Alternatively, or in addition, conditions for fuel vapor purging may be judged to be present when temperature and/or pressure in one or more fuel tanks is greater than a threshold temperature or pressure, when pressure in an intake manifold is below a threshold, etc. If method 400 judges that conditions are present for purging fuel vapors from the fuel vapor storage canisters, the answer is yes and method 400 proceeds to 408. Otherwise, the answer is no and method 400 proceeds to 410.

At 410, method 400 closes fuel system purge valves (e.g., purge valve 204 of FIG. 2 and purge valves 304, 308, and 318 of FIG. 3. The fuel system purge valves may be closed to reduce the possibility of drawing fuel vapors into an engine that is not combusting an air-fuel mixture or during conditions where the engine may not operate as is desired if the purge valves are at least partially opened. Method 400 proceeds to exit after fuel vapor purge valves are closed.

At 408, method 400 opens fuel vapor purge valves according to engine fuel octane requirements at the present engine speed and load. Further, if the fuel system has more than one purge valve (e.g., FIG. 3), a number of fuel purge valves less than the full complement of fuel purge valves may be opened in response to the amount of higher octane fuel the engine uses while operating at the present engine speed and load. For example, if the engine uses only a small amount of higher octane fuel at the present engine speed and load to limit the possibility of engine knock, only one of three fuel purging valves may be opened. If the engine does not use higher octane fuel at the present operating conditions, the fuel vapor purge valves are not opened unless fuel pressure and/or temperature in one of the fuel system fuel tanks is greater than a threshold pressure or temperature. However, if the engine uses a greater amount of higher octane fuel at the present engine operating conditions, all fuel vapor purge valves may be opened to fuel the engine and reduce the possibility of engine knock. In this way, higher octane fuel vapors may be conserved for engine operating conditions where use of higher octane fuel may be more beneficial (e.g., higher engine speeds and loads). The engine octane number requirement may increase as engine load increases and/or engine speed decreases. Method 400 proceeds to exit after fuel vapor purge valves are opened and closed in response to engine speed and load conditions.

At 412, method 400 judges whether or not temperature and/or pressure (e.g., fuel vapor temperature or fuel vapor pressure) in one or more of the fuel system fuel tanks is increasing. Temperature and/or pressure within a fuel system may be measured via sensors or estimated. If method 400 judges that temperature and/or pressure in one or more fuel tanks is increasing, the answer is yes and method 400 proceeds to 414. Otherwise, method 400 proceeds to 416.

Alternatively, method 400 may increase temperature and/or fuel pressure in one or more fuel tanks in response to a low amount of higher octane fuel or a low amount of fuel vapors stored in fuel vapor storage canisters at 412. The fuel tank temperature may be increased via circulating a fluid heated via engine exhaust gases or engine coolant to one or more fuel tanks. Method 400 proceeds to 414 if fuel tank heating is activated. Otherwise, method 400 proceeds to 416.

At 414, method 400 opens vapor valves. In particular, vapor valves that are in fluidic communication or associated with a fuel tank that is rising in temperature and/or pressure are opened. Vapor valves that are in fluidic communication or associated with fuel tanks where temperature and/or pressure are not rising may remain in a closed state. For example, for the system of FIG. 2, if temperature in fuel tank 232 is increasing, fuel vapor valve 208 may be opened while fuel vapor valves 206 and 210 may remain closed when fuel temperature and/or pressure is not increasing in fuel tanks 230 and 234. Similarly, for the system of FIG. 3, if temperature in fuel tank 232 is increasing, fuel vapor valves 312 may be opened to allow fuel vapors into fuel vapor storage canister 306 while fuel vapor valves 310, 322, and 320 remain closed. On the other hand, if temperature and/or pressure is increasing in fuel tanks 230, 232, and 234, fuel vapor valves 312 and 322 may be opened while fuel vapor valves 310 and 320 are in a closed state so that fuel vapor from fuel tank 230 does not enter fuel vapor canisters 306 and 316. Thus, fuel vapor valves may be commanded to open depending on whether or not temperature and/or pressure is increasing in fuel tanks associated with the respective fuel vapor valves. Further, opening vapor valve 312 while fuel system temperature is increasing allows fuel vapors to flow from fuel tank 232 to fuel vapor canister 306 without fuel from fuel tanks 230 and 234 or fuel vapor canisters 316 and 302 from entering fuel tank 232. Likewise, opening vapor valve 322 while fuel system temperature is increasing allows fuel vapors to flow from fuel tank 234 to fuel vapor canister 316 without fuel from fuel tanks 230 and 232 or fuel vapor canisters 302 and 306 from entering fuel tank 234. Method 400 proceeds to exit after fuel vapor valves associated with fuel tanks where temperature and/or pressure are increasing are opened.

At 416, method 400 judges whether or not temperature and/or pressure are decreasing in one or more fuel tanks of the fuel system. The temperature and/or pressure within each of the fuel tanks in the fuel system may be inferred or measured via a sensor. If temperature and/or pressure in one or more fuel tanks in the fuel system is determined to be decreasing, the answer is yes and method 400 proceeds to 418. Otherwise, the answer is no and method 400 proceeds to 422.

At 418, method 400 opens a vapor valve that is positioned in a conduit between a fuel tank storing a higher octane fuel as compared to other fuel tanks in the fuel system and a fuel vapor storage canister that is storing fuel vapors from the fuel tank storing higher octane fuel. In systems where no vapor valve is positioned along a conduit between the fuel tank storing the higher octane fuel and the fuel vapor storage canister that is storing fuel vapors from the fuel tank storing higher octane fuel, no vapor valve along a conduit between the fuel tank storing higher octane fuel and the fuel vapor storage canister that is storing fuel vapors from the fuel tank storing higher octane fuel is opened at 418.

For example, vapor valve 206 is opened in the fuel system shown in FIG. 2 since vapor valve is positioned along a conduit that allows fluidic communication between fuel tank 230 and fuel vapor storage canister 202. Since no vapor valve is shown along conduit 388 which allows fluidic communication between fuel tank 230 and fuel vapor storage canister 302, no vapor valve along a conduit between the fuel tank storing higher octane fuel and the fuel vapor storage canister that is storing fuel vapors from the fuel tank storing higher octane fuel is opened at 418 for the system shown in FIG. 3. However, vapor valves that allow fuel vapors into the fuel tank storing higher octane fuel from fuel vapor storage canisters storing fuel vapors from fuel tanks holding lower octane fuels are opened. For example, vapor valves 310 and 320 may be opened when temperature and/or pressure in one or more fuel tanks is decreasing. In particular, vapor valves 310 and 320 may be opened and vapor valves 312 and 322 may be closed when temperature and/or pressure is decreasing in fuel tank 230. By opening vapor valves that allow fluidic communication between fuel vapor storage canisters and the fuel tank storing higher octane fuel, it may be possible to transfer higher octane fuel components from fuel tanks storing lower octane fuels to a fuel tank storing higher octane fuel (e.g., from tanks 232 and 234 to tank 230). The fuel vapors may condense into liquid fuel within the fuel tank storing the higher octane fuel. In this way, component fuels may be separated with reduced parasitic losses.

At 420, method 400 closes vapor valves for fuel tanks in fuel systems that hold lower octane fuels. For example, in the fuel system of FIG. 2, vapor valves 208 and 210 are closed to reduce the possibility of transferring higher octane fuel vapors to fuel tanks holding lower octane fuels. In the fuel system of FIG. 3, method 400 closes vapor valves 312 and 322 to reduce the possibility of transferring higher octane fuel vapors to fuel tanks holding lower octane fuels. In other examples, check valves may replace vapor valves 208 and 210 in the system of FIG. 2. Similarly, check valves may replace vapor valves 312 and 322 in the system of FIG. 3, if desired. Method 400 proceeds to exit after the vapor valve positions are adjusted.

At 422, method 400 closes vapor valves after a predetermined amount of time has passed since temperature and/or pressure in the fuel tanks has increased or decreased. By closing the vapor valves, it may be possible to limit fluidic communication between fuel tanks and fuel vapor storage canisters when conditions in the fuel system are static.

In this way, method 400 allows operating states of fuel system valves to be adjusted while the engine is stopped so that fuel separation may occur without recombining higher octane fuels with lower octane fuel during diurnal heating and cooling that often occurs each day. Further, method 400 may use engine waste heat to increase the production of higher octane fuel vapors. Once higher octane fuel components are separated and stored in fuel vapor storage canisters, the higher octane fuel components remain separated from the lower octane fuels stored in the fuel tanks. The higher octane fuel vapors stored in fuel vapor storage canisters may be condensed in a fuel tank holding higher octane fuel before being injected to the engine.

Thus, the method of FIG. 4 provides for operating an engine, comprising: separating fuel vapors from a first lower octane fuel; storing the separated fuel vapors in a first fuel vapor storage canister; and limiting the separated fuel vapors from entering a second fuel tank holding the first lower octane fuel while not limiting the separated fuel vapors from entering a first fuel tank holding a higher octane fuel. The method further comprises separating fuel vapors from a second lower octane fuel, storing the separated fuel vapors from the second lower octane fuel in the first fuel vapor storage canister, and limiting the separated fuel vapors from the second lower octane fuel from entering a third fuel tank holding the second lower octane fuel and the second fuel tank holding the first lower octane fuel while not limiting the separated fuel vapors from the second lower octane fuel from entering the first fuel tank holding the higher octane fuel.

In one example, the method further comprises separating fuel vapors from a second lower octane fuel, storing the separated fuel vapors from the second lower octane fuel in a second fuel vapor storage canister, and limiting the separated fuel vapors from the second lower octane fuel from entering a third fuel tank holding the second lower octane fuel and the second fuel tank holding the first lower octane fuel while not limiting the separated fuel vapors from the second lower octane fuel from entering the first fuel tank holding the higher octane fuel. The method further comprises transferring fuel vapors from the first fuel vapor storage canister and the second fuel vapor storage canister to the first fuel tank. The method includes where separating fuel vapors from the lower octane fuel occurs in response to an increase in ambient temperature. The method includes where the increase in ambient temperature increases a fuel tank temperature. The method further comprises condensing the separated fuel vapors into liquid fuel within the first fuel tank and injecting the liquid fuel to the engine.

The method of FIG. 4 also provides for operating an engine, comprising: separating fuel vapors from a first lower octane fuel via diurnal heating; storing the separated fuel vapors in a first fuel vapor storage canister; and limiting the separated fuel vapors from entering a second fuel tank holding the first lower octane fuel while not limiting the separated fuel vapors from entering a first fuel tank holding a higher octane fuel in response to diurnal cooling. The method includes where fuel vapors enter the first fuel vapor storage canister only via the second fuel tank and where the fuel vapors exit the first fuel vapor storage canister and flow only to the engine or the first fuel tank. The method includes where fuel vapors entering a second fuel vapor storage canister enter only via a third fuel tank and where the fuel vapors exit the second fuel vapor storage canister and flow only to the engine or the first fuel tank.

In some examples, the method further comprises storing fuel vapors from a third fuel tank in the first fuel vapor storage canister. The method further comprises limiting fuel vapors from the third fuel tank from entering the second fuel tank. The method further comprises limiting fuel vapors in the first fuel vapor storage canister from entering the third fuel tank. The method includes where the engine is not rotating during the diurnal heating.

The method of FIG. 4 also provides for operating an engine, comprising: separating fuel vapors from a lower octane fuel; storing the separated fuel vapors in a first fuel vapor storage canister; and limiting the separated fuel vapors from entering a second fuel tank holding the lower octane fuel while not limiting the separated fuel vapors from entering a first fuel tank holding a higher octane fuel; and purging the separated fuel vapors in response to engine fuel octane requirements. The method includes where the engine fuel octane requirements are based on engine speed and load. The method includes where the engine fuel octane requirement increases in response to an increase in engine load.

In some examples, the method includes where the separated fuel vapors are purged only when higher octane fuel is supplied to the engine based on engine speed and load. The method includes where the separated fuel vapors are not purged when only lower octane fuel is supplied to the engine based on engine speed and load. The method further comprises separating fuel vapors from the higher octane fuel and supplying fuel vapors from the higher octane fuel and fuel vapors from the first lower octane fuel to the engine.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
separating higher octane fuel vapors from a first lower octane fuel;
storing the separated fuel vapors via carbon of a first fuel vapor storage canister;
limiting the separated fuel vapors from entering a second fuel tank holding the first lower octane fuel while not limiting the separated fuel vapors from entering a first fuel tank holding a higher octane fuel, where the limiting includes closing a fuel vapor valve responsive to a decrease in pressure in a fuel tank storing the first lower octane fuel and the engine being stopped; and
supplying fuel vapors to carbon of a second fuel vapor storage canister only via a third fuel tank, releasing fuel vapors from the carbon of the second fuel vapor storage canister only to the engine or the first fuel tank, and storing fuel vapors from the first fuel vapor storage canister and the second fuel vapor storage canister in carbon of a third fuel vapor storage canister.

2. The method of claim 1, further comprising not purging fuel vapor from carbon of the first fuel vapor storage canister when only lower octane fuel is supplied to the engine via a fuel injector based on engine speed and load.

3. The method of claim 1, further comprising limiting the fuel vapors from the carbon of the second fuel vapor storage canister from entering the third fuel tank while not limiting the fuel vapors from the carbon of the second fuel vapor storage canister from entering the first fuel tank holding the higher octane fuel.

4. The method of claim 3, further comprising transferring fuel vapors from the first fuel vapor storage canister and the second fuel vapor storage canister to the first fuel tank.

5. The method of claim 1, where separating higher octane fuel vapors from the first lower octane fuel occurs in response to an increase in fuel temperature.

6. The method of claim 5, where the increase in fuel temperature is due to heat transferred from engine exhaust.

7. The method of claim 1, further comprising condensing the separated fuel vapors into liquid fuel within the first fuel tank and injecting the liquid fuel to the engine.

8. A method for operating an engine, comprising:
separating fuel vapors from a first lower octane fuel via fuel temperature changes;
storing the separated fuel vapors via carbon in a first fuel vapor storage canister;
limiting the separated fuel vapors from entering a second fuel tank holding the first lower octane fuel while not limiting the separated fuel vapors from entering a first fuel tank holding a higher octane fuel in response to fuel vapor cooling, and where fuel vapors enter the first fuel vapor storage canister only via the second fuel tank and where the fuel vapors exit the first fuel vapor storage canister and flow only to the engine or the first fuel tank, and where limiting the separated fuel vapors from entering the second fuel tank holding the first lower octane fuel includes closing a fuel vapor valve responsive to a pressure decrease in the second fuel tank; and
storing fuel vapors from a third fuel tank holding a second lower octane fuel in carbon of a second fuel vapor storage canister, and storing fuel from the first and second fuel vapor storage canisters in carbon of a third fuel vapor storage canister.

9. The method of claim 8, where fuel vapors entering the second fuel vapor storage canister enter only via the third fuel tank and where the fuel vapors exit the second fuel vapor storage canister and flow only to the engine or the first fuel tank.

10. The method of claim 8, further comprising storing fuel vapors from the third fuel tank in the first fuel vapor storage canister.

11. The method of claim 10, further comprising limiting fuel vapors from the third fuel tank from entering the second fuel tank.

12. The method of claim 11, further comprising limiting fuel vapors in the first fuel vapor storage canister from entering the third fuel tank.

13. The method of claim 8, where the engine is not rotating and the fuel temperature changes are due to diurnal heating and cooling.

14. The method of claim 8, where the fuel temperature changes are due to controlled heat transfer from engine coolant.

15. A method for operating an engine, comprising:
separating fuel vapors from a lower octane fuel;
storing the separated fuel vapors in carbon of a first fuel vapor storage canister via opening a fuel vapor valve in response to increasing pressure in a fuel tank;
limiting the separated fuel vapors from entering a second fuel tank holding the lower octane fuel while not limiting the separated fuel vapors from entering a first fuel tank holding a higher octane fuel, where limiting the separated fuel vapors from entering the second fuel tank includes closing the fuel vapor valve in response to decreasing pressure in the fuel tank; and
purging the separated fuel vapors from the carbon of the first fuel vapor storage canister in response to engine fuel octane requirements, and where the separated fuel vapors are not purged from the carbon of the first fuel vapor storage canister when only lower octane fuel is supplied to the engine via a fuel injector based on engine speed and load, and further comprising separating fuel vapors from the higher octane fuel, storing fuel vapors from the higher octane fuel in carbon of a second fuel vapor storage canister and supplying fuel vapors from the carbon of the second fuel vapor storage canister and fuel vapors from the carbon of the first fuel vapor storage canister to the engine.

16. The method of claim 15, where the engine fuel octane requirements are based on engine speed and load.

17. The method of claim 15, where the engine fuel octane requirements increase in response to an increase in engine load.

18. The method of claim 15, where the separated fuel vapors are purged from the carbon of the first fuel vapor storage canister only when higher octane fuel is supplied to the engine based on engine speed and load.

19. The method of claim 15, further comprising supplying fuel vapors from carbon of a third fuel vapor storage canister to the engine.

* * * * *